US007657605B2

(12) United States Patent
Blohm (10) Patent No.: US 7,657,605 B2
(45) Date of Patent: Feb. 2, 2010

(54) PRESENCE ENHANCED ONLINE PROCESSES

(75) Inventor: Jeffrey M. Blohm, Portola Valley, CA (US)

(73) Assignee: Siemens Communications, Inc., Boca Raton, FL (US)

(*) Notice: Subject to any disclaimer, the term of this patent is extended or adjusted under 35 U.S.C. 154(b) by 351 days.

(21) Appl. No.: 11/514,785

(22) Filed: Sep. 1, 2006

(65) Prior Publication Data

US 2008/0059493 A1    Mar. 6, 2008

(51) Int. Cl.
G06F 15/16 (2006.01)
G06F 15/177 (2006.01)
G06F 9/44 (2006.01)

(52) U.S. Cl. ............... 709/207; 709/206; 709/221; 717/172; 717/171

(58) Field of Classification Search ............... 709/224, 709/206, 207, 221; 717/172
See application file for complete search history.

(56) References Cited

U.S. PATENT DOCUMENTS

| 6,003,081 A * | 12/1999 | Cromer et al. ............ 709/224 |
| 6,167,567 A * | 12/2000 | Chiles et al. ............ 717/173 |
| 6,853,634 B1 * | 2/2005 | Davies et al. ............ 370/349 |
| 2004/0215723 A1 * | 10/2004 | Chadha ............ 709/206 |
| 2006/0164421 A1 * | 7/2006 | Cromer et al. ............ 345/473 |
| 2007/0094661 A1 * | 4/2007 | Baird et al. ............ 718/102 |

* cited by examiner

Primary Examiner—Kevin Bates (57) ABSTRACT

In some embodiments, a managed presence online processing system may include one or more of the following features: (a) a memory comprising, (i) presence information submitted from a user, and (ii) a presence online processing program that initiates online processes on the user's computer based upon the presence information of the user, and (b) a processor coupled to the memory that executes the presence online processing program.

20 Claims, 8 Drawing Sheets

PRESENCE ENHANCED ONLINE PROCESSES

FIELD OF THE INVENTION

This invention relates to presence and presence management systems that communicate presence information. In particular, this invention relates to the combined use of presence information with other systems. More particularly, this invention relates to the use of presence information to enhance the ability of online processes to interact with end users.

BACKGROUND OF THE INVENTION

In computer and telecommunications networks, presence information conveys availability and willingness of a user (called a presentity) to communicate. A user's client provides presence information to a presence service to be stored and distributed to other users (called watchers) to convey its communication state. Presence information has wide application in many areas, including voice over IP (VoIP) and instant messaging (IM).

A user client may publish a presence state to indicate its current communication status. This published state informs others that wish to contact the user of their availability and willingness to communicate. The most common use of presence today is the status indicator displayed on most instant messaging clients. A simpler everyday example is the 'on-hook' or 'off-hook' state of a telephone receiver, resulting in a distinctive ring tone for a caller. Some states that offer extended information on the user's availability are "free for chat", "away", "do not disturb", and "out to lunch", which are often seen on many modern instant messaging clients. Rich information such as user mood and location may be also included. Presence is different from traditional 'on-hook' telephone status in that it deals with the user not the device (you want to talk to a person, not to a telephone).

Users have the potential to publish different presence states depending on who the communicator (or watcher) is. A worker may only want colleagues to see detailed presence information during office hours, for instance. Some users may want to only publish information to a select few. Basic versions of this idea are already common in instant messaging clients as a 'Block' facility, where users can appear as unavailable to selected watchers.

Software management system (SMS) is a systems management software for managing large groups of Windows™-based computer systems. SMS is an example of an online process, and supports capabilities such as remote control, patch management, software distribution, and hardware and software inventory. Some SMS applications can manage up to twenty five thousand Advanced Clients.

Presently online processes such as software inventory management and software management often disrupt users at inopportune times. Passive disruptions such as inventory management consume resources on targeted machines, slowing machines that may be actively in use by the end user. Even worse are active disruptions such as software management applications that decide that the user must install a new application immediately. Another example is the unfortunate user running a presentation when the software management application immediately asserts that critical software patches must be installed. Even if the user can dismiss the online software management process, the act of dismissing it disrupts the presentation and often temporarily disrupts the entire meeting.

Presently, most online processes blindly process their community of targeted users repeatedly until all members of that community have been successfully processed. The process simply attempts to access the next user (or all users) in the community. If the access attempt is successful the process performs its function; if the access attempt is not successful the user remains on the "to be processed" queue.

The biggest disadvantage of this approach is that it does nothing to take the targeted users actual working state into account. It is a blind process. If the process can contact the targeted user's machine, it does so. This results in intrusive interactions at poorly chosen moments of time.

Therefore, it is desirable to have a system that prioritizes the ordering of users targeted by online processes in order to minimize disruptive interactions with those users.

SUMMARY OF THE INVENTION

These and other drawbacks in the prior art are overcome in large part by a system and method according to embodiments of the present invention.

In some embodiments, a method for managed online processes may include one or more of the following steps: (a) creating a list of targeted users, (b) obtaining presence information for the targeted users, (c) prioritizing the targeted users based upon the presence information, (d) creating an eligible list of the targeted users to have an online process performed on their computer, (e) creating a deferred list of the targeted users to have an online process performed on their computer at a delayed time, (f) accessing a first targeted user in the list, (g) initiating the online process on the first targeted user's computer, (h) determining if the targeted user is a final targeted user to have the online process performed on their computer, and (i) creating a list of all remaining eligible and deferred targets.

In some embodiments, a managed presence online processing system may include one or more of the following features: (a) a memory comprising, (i) presence information submitted from a user, and (ii) a presence online processing program that initiates online processes on the user's computer based upon the presence information of the user, and (b) a processor coupled to the memory that executes the presence online processing program.

In some embodiments, a machine readable medium comprising machine executable instructions, may include one or more of the following features: (a) list instructions that creates a list of targeted online process users, (b) presence instructions that obtains presence information for the users from a presence system, (c) order instructions that prioritize the users based upon their presence information, (d) access instructions that accesses the users in the eligible list, (e) process instructions that initiates an online process on the accessed user's computer, (f) target instructions that determine if the process instructions have performed an online process on all the eligible users, (g) criteria instructions that determines if the deferred users can be moved to the eligible users list.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention use presence information to enhance the ability of online processes to interact with end users at the most effective times, thus minimizing disruptions. Online processes such as software inventory collection, software management, security scans, etc. can be enhanced to take effective advantage of presence information. This can eliminate the annoyance of online processes interrupting users at inopportune times (such as while giving a presentation). This is accomplished by enhancing the online process with a presence based mechanism that can prioritize the targeted users in such a way as to minimize disruptive interactions.

Figure 1:
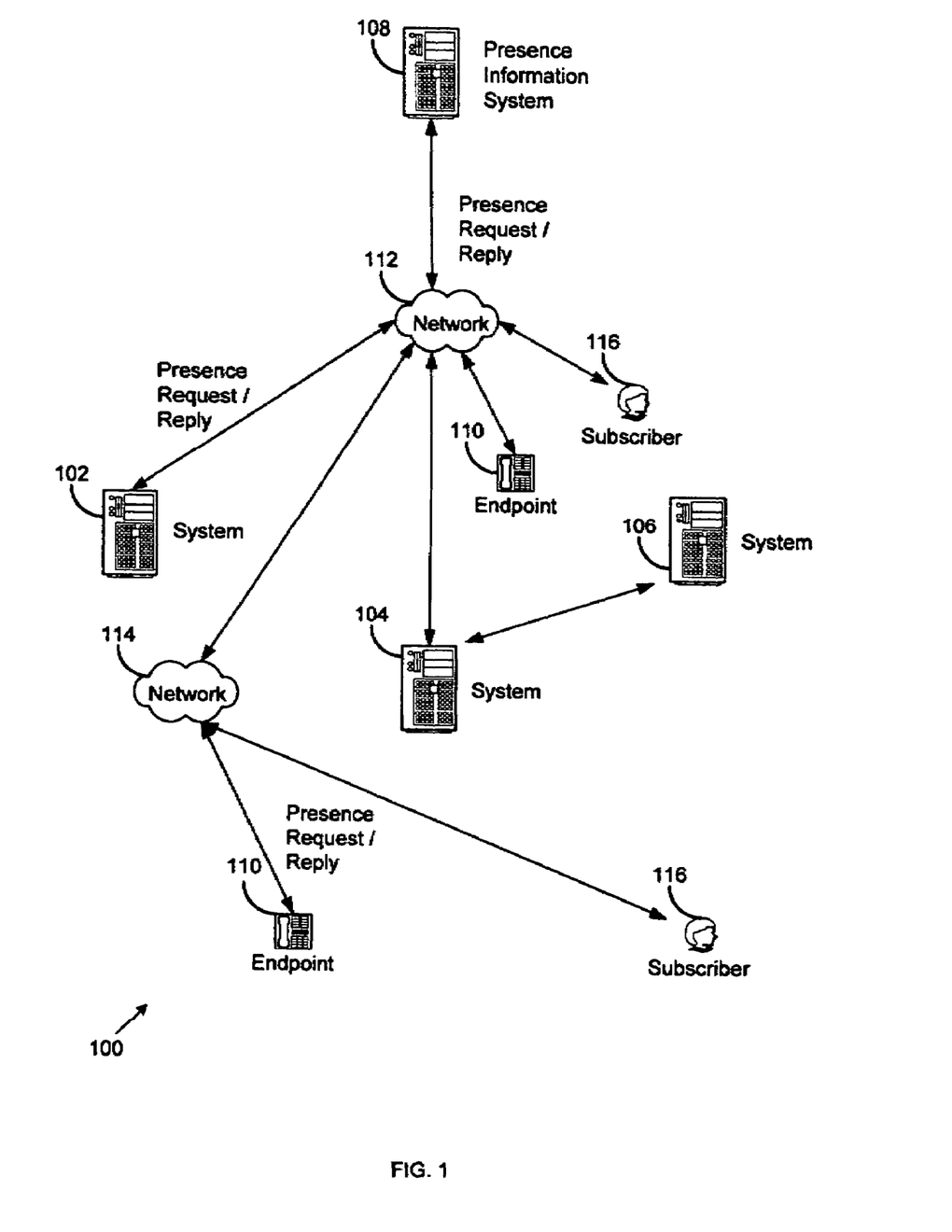
FIG. 1 shows one implementation of a presence network in an embodiment of the present invention.

With reference to FIG. 1, a presence system network 100 is shown. The entities interacting in network 100 may include systems 102, 104, and 106 that can host online processes, a presence information system 108, endpoints 110, and/or other entities. The systems 102-106 may subscribe to the presence information system 108 to obtain presence information on behalf of a subscriber 116. As will be described in more detail below, the presence information system 108 may allow or block access to the presence information in a contact manner. Systems 102-106 may be generic servers, or multimedia messaging systems, or may selectively process specific types of messages such as voice messages, fax messages, instant messages, or other messages. System 102-106 may, for example, represent home or business computers that execute messaging programs such as instant messaging programs, email programs, video conferencing programs, or other messaging programs. Presence information for a subscriber/user 116 may be communicated between endpoints 110, presence information system 108, and/or systems 102-106.

Entities 102-110 may communicate over one or more networks 112, 114 or interconnection of networks. Entities 102-110 and networks 112, 114 may exchange information using a packet based protocol. For example, systems 102-106, presence information system 108, and endpoints 110 may employ the Session Initiation Protocol (SIP) over the User Datagram Protocol (UDP). Other protocols, including the Transmission Control Protocol/Internet Protocol (TCP/IP) or other network protocols may be additionally or alternatively employed. In addition, the signaling between entities 102-110 may proceed according to the H.323 packet-based multimedia communications system standard published by the International Telecommunications Union (ITU). Network 100 or interconnection of networks 112, 114 may include the Public Switched Telephone Network (PSTN) and may deliver data to home or business computers, programs, PDAs, pagers, cell phones, wireline phones, internet phones, or any other communication device, electronic system, or system component or program.

The entities in network 100 may employ protocols that adhere to any desired specification. For example, entities 102-110 may employ the Session Initiation Protocol (SIP) developed for Internet conferencing, telephony, presence, events notification and instant messaging, or SIP for Instant Messaging and Presence Leveraging Extensions (SIMPLE), or the Extensible Messaging and Presence Protocol (XMPP). The form and content of the presence information may be established according to protocols consistent with the Internet Engineering Task Force (IETF) Request for Comments (RFC) 2778 or IETF RFC 2779. Alternatively, the entities may employ extensions to RFC 2778 or RFC 2779, or may employ proprietary protocols.

Subscribers 116 interact with network 100. A subscriber 116 may be any entity that may be associated with presence information, including a human being, an electronic device, a computer program, or other entity. Subscriber 116 may have one or more presence states that may be relative to one or more endpoints 110. Table 1 shows examples of presence states and descriptions of the presence states.

TABLE 1

| Presence State | Description |
| --- | --- |
| 'Available' | The subscriber is in the office and available to receive messages. |
| 'On the Phone' | The subscriber is in the office, but is on the phone. |
| 'In Office' | The subscriber is in the office. |
| 'Be Right Back' | The subscriber is in the office but is not available. |
| 'In Meeting' | The subscriber is in the office but is not available because they are in a meeting. |
| 'On Business Trip' | The subscriber is not in the office and is not available to receive messages. |
| 'Out of Office' | The subscriber is not in the office and is not available to receive messages. |

TABLE 1-continued

| Presence State | Description |
| --- | --- |
| 'On Vacation' | The subscriber is not available to receive messages. |
| 'No Interruptions' | The subscriber is in the office but is not available to receive messages. |
| 'Working Remotely' | The subscriber is working and available, but not in the office. |
| 'Unknown' | It is not known whether the subscriber is available. |

The presence states shown in Table 1 may be applicable to an individual subscriber 116. The states above are exemplary. Different presence systems can have different states. Embodiments of the present invention can be easily adapted to the states available in a particular presence system. The presence states may also be applicable to other entities, including aggregate entities such as workgroups, group mailboxes or group phone connections. For example, a presence state may reflect the availability of a group of customer service representatives in a complaint department. When no representative is available to handle the call, the associated presence state may be 'On the Phone'. The presence information may reflect the availability of at least one member of the group, or may reflect other presence information applicable to the group as a whole.

For example, the 'Be Right Back' presence state indicates that subscriber 116 is in the office or otherwise available. However, subscriber 116 is temporarily away from the endpoint at which subscriber 116 receives messages. Different, fewer, or additional presence states may be used. As another example, the collection of presence states may simply be 'Idle', 'Busy', and 'Away'.

Presence states may also reflect an aggregated media state. The aggregated media states may apply to specific types of communication or may apply over any other subset of endpoints 110 associated with subscriber 116. As examples, the aggregated media states may apply to voice communications, instant messaging, and email messaging. Accordingly, a subscriber that is associated with multiple endpoints (e.g., phone numbers, email addresses, or instant messaging addresses) may have a presence state that aggregates availability over any subset of the endpoints. For example, a subscriber 116 with a desk phone and a cell phone may have an aggregated media presence state of 'Busy' when at least one of the phones is in use. As another example, the subscriber may have an aggregated media presence state of 'Available' when both phones are not in use. Table 2 shows examples of aggregated media states. Different, fewer, or additional aggregated presence states may be used.

TABLE 2

| Presence State | Note |
| --- | --- |
| 'Busy' | The subscriber is in the office but is currently busy. |
| 'Online' | The subscriber is in the office and is connected to an instant messaging service. |
| 'Offline' | The subscriber is disconnected from their instant messaging service. |
| 'Unknown' | The actual state of the subscriber is currently unknown. |
| 'Available' | The subscriber is in the office, and is not on the phone, interacting with instant messaging, or interacting with an email system. |

Endpoints 110 and/or subscribers 116 may communicate presence information to presence information system 108. For example, endpoints 110 may monitor subscriber activity and communicate a presence message to presence information system 108. The presence message may indicate, as examples, that the subscriber has initiated a phone call, ended a phone call, started to type an instant message or email message, or may indicate any other presence information.

The presence state information may be communicated in the form of a presence document. The format of the presence document may adhere to any proposed or accepted standard for communicating presence information. In one implementation, the presence document is an extensible markup language (XML) document that identifies a subscriber and the presence or availability of the subscriber with respect to one or more 'addresses', including endpoints such as telephone numbers, email addresses, instant messaging addresses, or the like. When an endpoint 110 publishes a presence document to presence information system 108, the presence document typically only contains information about that particular endpoint 110. Presence information system 108 may then aggregate information from all of subscriber's endpoints 110. The aggregate presence document may be made available in whole or in part to other endpoints that request the presence information.

Presence information system 108 receives the presence document. Systems 102-108 may process the presence documents and may maintain presence information for one or more subscribers 116. Alternatively or additionally, systems 102-106 may receive presence documents from presence information system 108.

For example, system 102 may at any time poll or subscribe to presence information system 108 for the current presence state of a subscriber 116. In response, presence information system 108 may communicate a presence document for subscriber 116 to the system 102 hosting the online process. In such a case, system 102 acts as another endpoint with regard to receipt of presence information. Presence information system 108 need not send the presence document or populate the presence document with the requested information in every instance. However, instead, presence information system 108 may manage the availability of the subscriber presence state.

Figure 2:
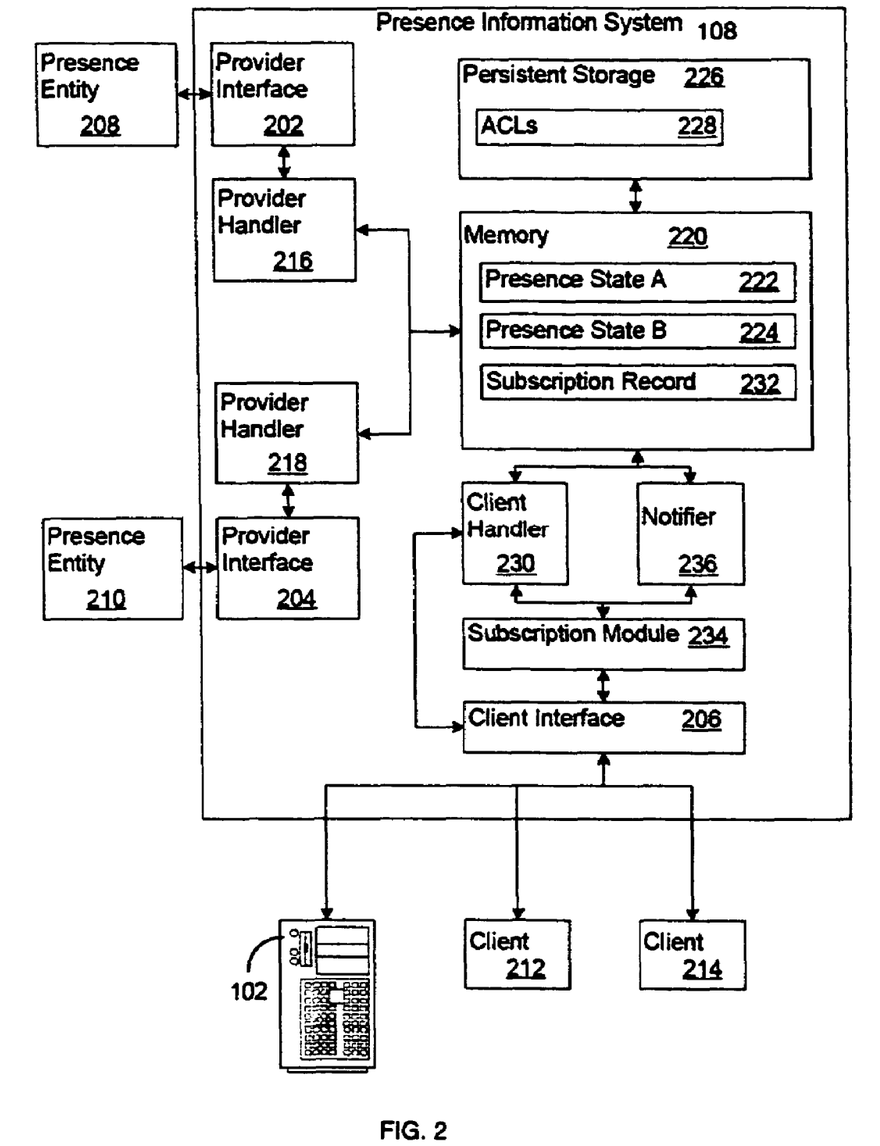
FIG. 2 shows one implementation of a presence state system in an embodiment of the present invention.

FIG. 2 shows a block diagram of the presence information system 108. The presence information system 108 may be a server or a set of servers. The presence information system 108 may be connected to the networks 112 and 114 through a corporate intranet, a direct network connection, or other network connection.

The presence information system 108 may include one or more provider interfaces (e.g., the interfaces 202 and 204) and a client interface 206. The provider interfaces 202 and 204 may include circuitry and/or logic for communicating with presence entities (e.g., the entities 208 and 210), for example to receive presence information submitted by the entities 208 and 210. The client interface 206 may include circuitry and/or logic for communicating with the system 102, programs, or other clients (e.g., the clients 212 and 214) that request presence state information.

The presence entities 208 and 210 may represent any subscriber, program, endpoint, device, or other entity that interacts with the presence information system 108. As examples, the presence entities 208 and 210 may be soft endpoints, hard endpoints, a Microsoft Office Communicator program, an IBM/Lotus Sametime Connect program, an AOL, MSN, Yahoo! instant messaging and presence program, a Siemens optiClient, or telephones, such as a Pingtel telephone or an optipoint telephone. Additional examples include programs such as calendars, groupware, document management systems; or other endpoints such as the network or communications infrastructure (which may indicate 'busy' even for devices that do not have explicit presence reporting), or dynamic presence proxies.

Similarly, clients may take many forms. Soft endpoints, hard endpoints, thin clients (e.g., clients without substantial processing capabilities and/or local storage), or other clients may request and receive presence state information through the client interface 206. Programs such as groupware, document management, and other enterprise software also may request and receive presence state information.

The presence entities 208 and 210 may comply with the IETF proposals noted above, or may employ proprietary protocols. The provider handlers 216 and 218 may provide an abstraction layer. The handlers 216 and 218 may convert presence information received from the presence entities 208 and 210 into a uniform format that may be stored in the memory 220.

The handlers 216 and 218 may also aggregate one or more presence states into an aggregated media state. The presence information system 108 may maintain presence states (e.g., the presence states 222 and 224) in the memory 220. As presence states change, the memory 220 may be updated, and the presence information system 108 may communicate presence state update information to clients.

The presence information system 108 may store all or part of the presence states 222 and 224 in a persistent storage 226. The persistent storage 226 may include a database with tables that store presence state information for one or more subscribers. The persistent storage 226 may also include other presence related information, such as Access Control Lists 228 (ACLs) or other security information that may determine which clients may obtain presence information for which subscribers.

The client interface 206 may receive presence state information requests, subscription requests, and other requests from a client. The requests may be communicated to the client handler 230 for processing. The client interface 206 may also transmit presence state information, including subscribed presence state information updates to the client.

The client handler 230 may perform request or client validation and may attempt to satisfy the request. When the request is a query, fetch, or poll of presence state information, the client handler 230 may check the identity of the client against the ACLs 228 for the subscriber whose presence is being checked. If the client is allowed to obtain the presence state information, the presence state information is retrieved from the memory 220 or persistent storage 226 and returned to the client interface 206.

If the client is not allowed to see the presence state information, the client may receive a predetermined presence value. The predetermined presence value may be selected so that the value does not give hints about the subscriber's presence. To that end, the value may specify 'Unknown', 'Offline', or another presence value. Alternatively, the presence information system 108 may reject the request for presence information.

When the request is a subscription request, the presence information system 108 may store a subscription record 232 in the memory 220. The subscription record 232 may include identifiers or other data that indicates that a particular client is watching one or more subscribers. The subscription record 232 may also specify presence filters that limit or include specific types of presence state information for transmission to the client. For example a presence filter may specify that only 'Available' or 'Busy' presence states should be communicated to the client. The subscription module 234 may receive subscription requests and identifying information concerning the client that is watching the subscriber.

The presence information system 108 may activate the notifier 236. For example, the presence information system 108 may activate the notifier 236 when any of the presence states are modified and there are clients that are watching those presences states. The notifier 236 may include circuitry and/or logic that inform the subscription module 234 that a change in presence state has occurred. The subscription module 234 may process the new presence state in conjunction with the outstanding presence subscriptions. For example, the subscription module 234 may apply a filter to the new presence state to determine if the new presence state is one that the client desires to receive. If so, the client interface 206 may communicate the presence state update information to the client that placed the subscription.

Figure 3:
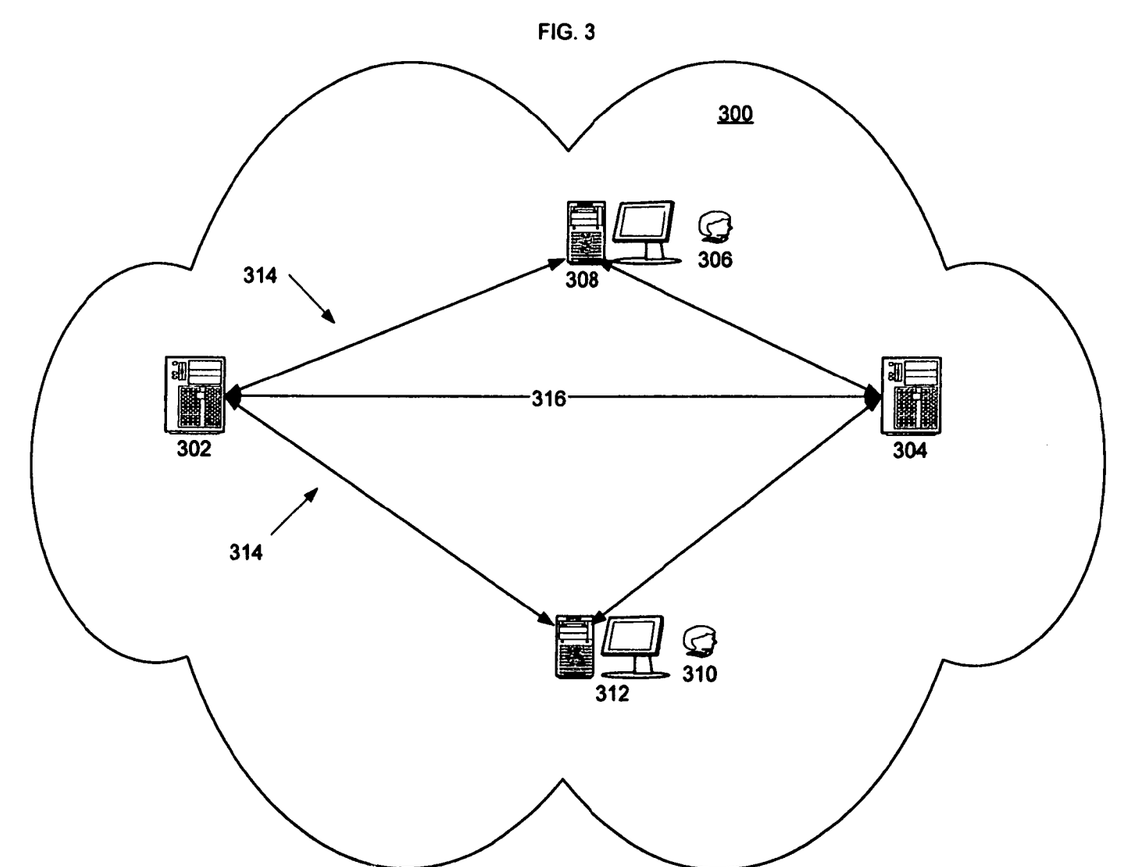
FIG. 3 shows a presence enhanced online process network in an embodiment of the present invention.

With reference to FIG. 3, a presence enhanced online process network in an embodiment of the present invention is shown. Network 300 is shown including presence system 302, online process system 304, subscriber A 306 at computer 308, and subscriber B 310 at computer 312. Subscriber A 306 and B 310 interact (represented by arrows 314) with presence system 302, either directly (e.g., user sets presence to "In Office" or "Busy") or indirectly (e.g., user logs onto presence system 302 or picks and uses the phone), to indicate the subscriber's current presence state. Online processes system 304 at some point begins an online process and assembles a list of targeted subscribers (in this case A 306 and B 310). Online process system 304 accesses (represented by arrow 316) presence information 228 of the targeted subscribers to determine availability. Using presence information 228 online process system 304 determines that B 310 should be processed first as A 306 has presence information 228 which indicates in some fashion that (s)he is busy. After processing all of the targeted users, online process system 304 terminates the online process. Examples of online processes include software management systems (like SMS) and software inventory systems.

The contribution of presence information 228 to the online process system 304 can be either a key dictating factor or merely a contributing factor. The administration of the application that manages the resource could also have other criteria, such as giving priority to certain individuals (upper management) or groups (board of directors).

FIG. 3 illustrates a scenario where all services reside within a single network 300. However, this is only illustrative purposes only. Network 300 could also be a federation of networks or it could also include elements resident on the internet.

The contribution of presence information 228 to online process system 304 can be either a key dictating factor or merely a contributing factor. The administration of the application that manages the resource could also have other criteria, such as giving priority to certain individuals (upper management) or groups (board of directors).

The following table uses the Identity Context presence values to illustrate a typical mapping of presence states to accessibility levels for online access by automated processes:

| Identity Context | Affinity for Online Access (1 is most accessible) |
| --- | --- |
| Out of Office | 1 |
| On Vacation | 1 |
| On Business Trip | 2 |

-continued

| Identity Context | Affinity for Online Access (1 is most accessible) |
|---|---|
| Be Right Back | 2 |
| Working Remotely | 2 |
| In Office | 2 |
| In Meeting | 3 |
| No Interruptions | 3 |
| Unknown | 3 |

Table 3—Access Affinity

Level one is most available for online processing while level three is least available for online processing. While counterintuitive to say that someone "out of office" is very available, it may indicate that while the subscriber is out of office, his/her computer is still online and communicating with presence system 302, and thus it is a great time to work on that machine because the user clearly isn't doing anything interactive with it. These User Presence states are merely exemplary and other presence states can also be used without departing from the spirit of the invention.

In addition, the prioritization of the states can be done with the requirements of the application in mind. For example, if the application requires interactivity with the subscriber, the best states might be "In Office" and "Working Remotely" and the worst states are those where the user is not present to interact with the process (e.g. "On Vacation", "Out of Office", "On Business Trip"). It is additionally noted that the degree to which the reported presence information 228 correlates to the actual state of the user and the state of the user's computer can vary from presence system to presence system.

Figure 4:
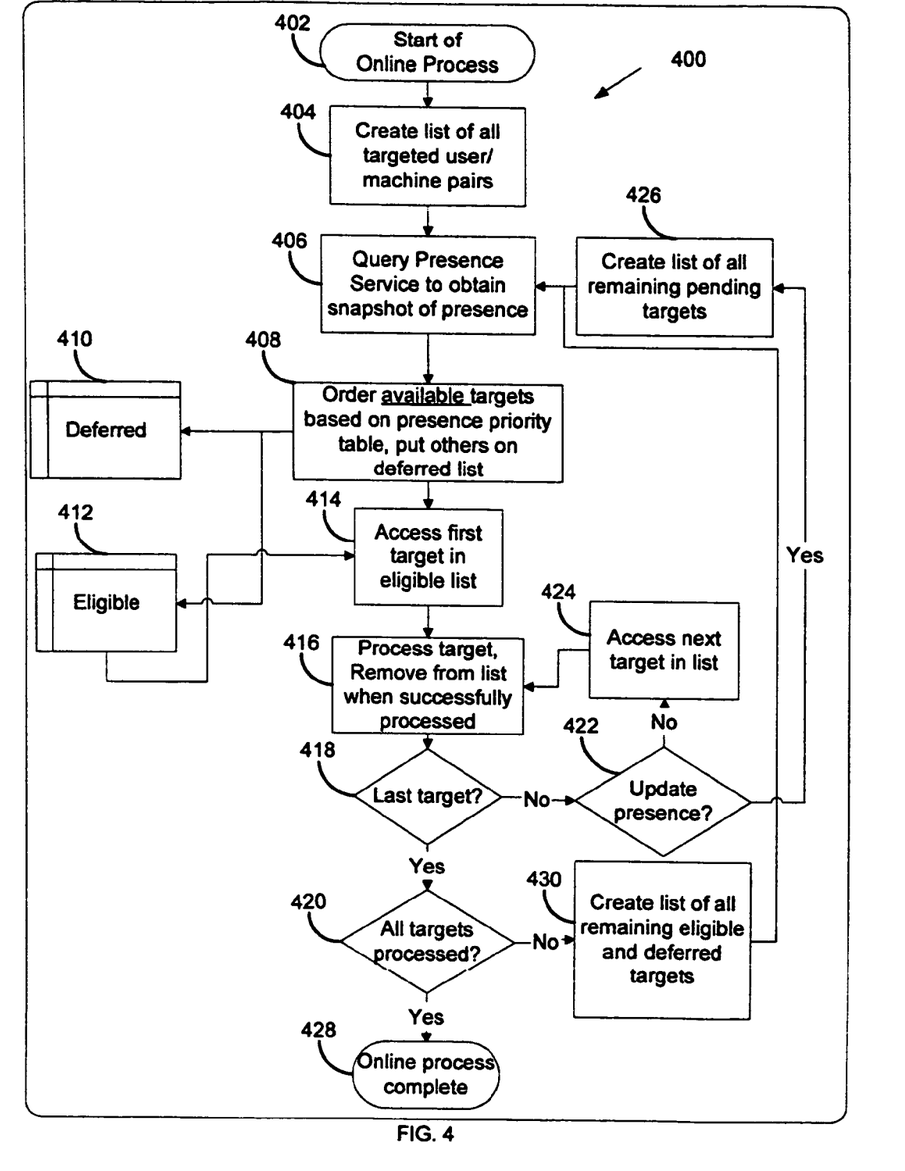
FIG. 4 shows a flow chart representation of a presence enhanced online process in an embodiment of the present invention.

With reference to FIG. 4, a flow chart representation of a presence enhanced online process in an embodiment of the present invention is shown. Presence enhanced online application 400 can begin at state 402 where application 400 begins an online process. A list of all targeted user/subscribers 116 and their associated machines is created at state 404. Application 400 can then query presence system 302 to obtain a snapshot of user's 116 presence information 228 at state 406. All available users 116 are ordered based upon a presence priority table (similar to that discussed above) and placed on eligible list 412 at state 408. All unavailable users 116 are placed on a deferred list 410 at state 408.

Application 400 can then access a first user 116 from eligible list 412 at state 414. The online process is executed for first user and user 116 is removed from the list of targeted users (state 404) when the online process is successfully completed at state 416. Application 400 then queries whether this was the last user in the currently eligible list for which to execute the online process at state 418. If it is the last user, application 400 then queries whether all users 116 have been processed at state 420. If not, application 400 then queries whether to query presence system 302 for presence information 228 at state 422. It is contemplated that any number of qualifications could initiate an updating of presence information 228, such as a predetermined time limit, an application manager set time limit, or a predetermined number of users 116 processed without departing from the spirit of the invention.

If application 400 determines not to update the presence information, the next user 116 is accessed in list 412 at state 424 and processed at state 416 and the process runs again. If application 400 determines to update the presence information, a new list of all remaining users 116 is created at state 426 and their presence information is obtained at state 426 and the process begins again.

If application 400 determines that all users 116 have been processed successfully, then the online process is terminated at state 428. If application 400 determines that all users 116 have not been processed successfully, then a list is created containing all remaining eligible and deferred users form lists 410 and 412 at state 430 and their presence information is obtained at state 406 and the process begins all over again.

Although FIG. 4 utilizes one (or more) presence snapshots (information scenes), another method could be to subscribe to the presence of the resource recipients. This would allow system 304 to dynamically adjust to changes in presence of recipients in an effective manner. A presence subscription based online process flow is shown with reference to the next three FIGs.

Figure 5:
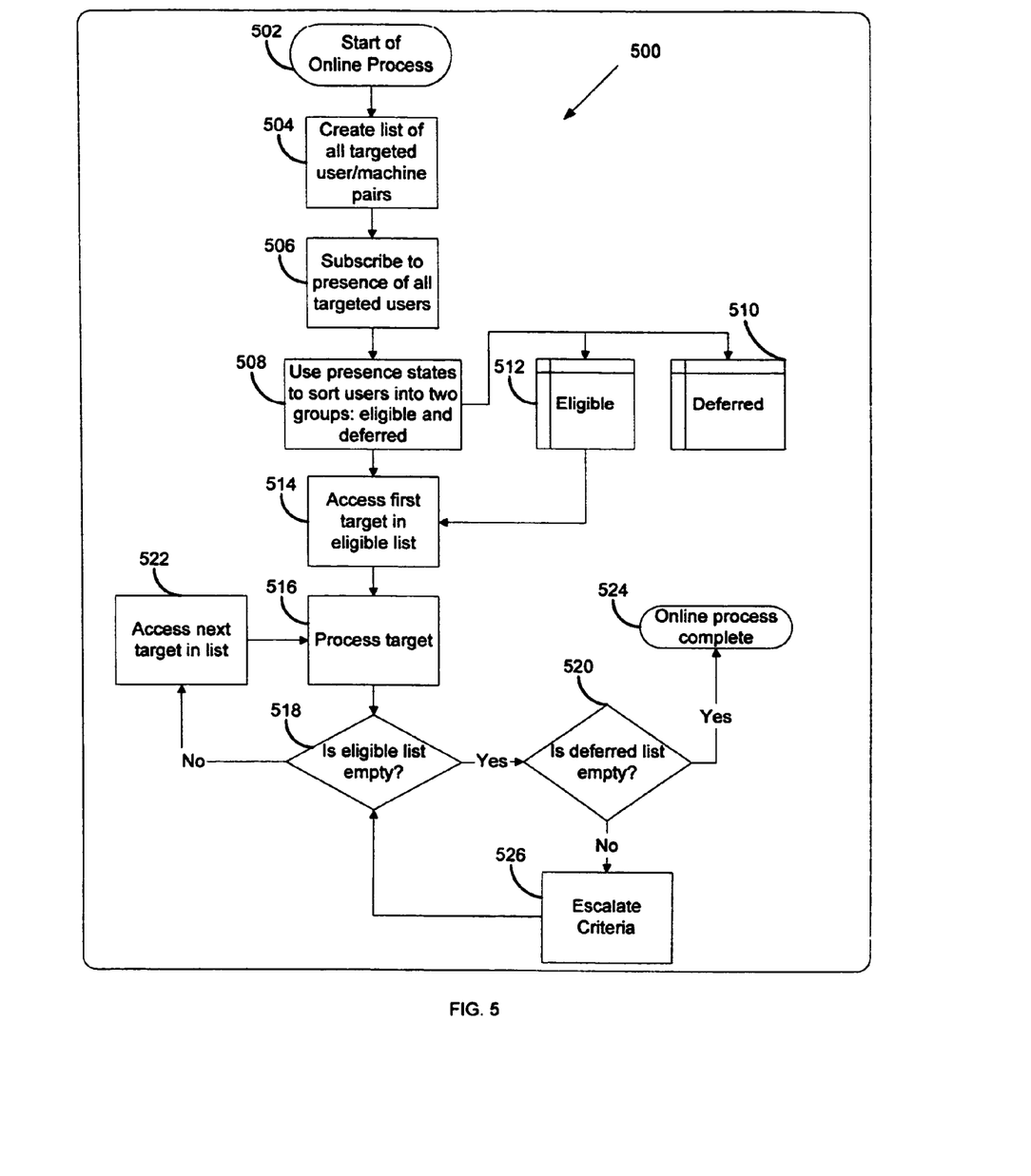
FIG. 5 shows a flow chart representation of a presence enhanced online process in an embodiment of the present invention.

With reference to FIG. 5, a flow chart representation of a presence enhanced online process in an embodiment of the present invention is shown. Presence enhanced online application 500 can begin at state 502 where application 500 begins an online process. A list of all targeted user/subscribers 116 and their associated machines is created at state 504. Application 500 can then subscribe to presence system 302 to dynamically obtain all user's 116 presence information 228 at state 506. All available users 116 are ordered based upon a presence priority table (similar to that discussed above) and placed on an eligible list 512 at state 508. All unavailable users 116 are placed on a deferred list 510 at state 508.

Application 500 can then access a first user 116 from eligible list 512 at state 514. The online process is executed for first user and user 116 is removed from the list of targeted users (state 504) when the online process is successfully completed at state 516. Application 500 then queries whether eligible list 512 is empty at state 518. If it is empty, application 500 then queries whether deferred list 510 is empty at state 520. If not, application 500 accesses next user 116 in list 512 at state 522 and processed at state 516 and the process runs again.

If deferred list 510 is empty, application 500 is terminated and the online process is complete at state 524. If deferred list 510 is not empty, then application 500 can escalate the presence criteria to make more users 116 eligible for the online process to be executed at state 526. Application then returns to state 518 to determine if list 512 is empty and begin the process again. It is further contemplated that if deferred list 510 is not empty then a time delay could be initiated in which to wait for the deferred users to become eligible. It is contemplated that any number of methods of discovering if a deferred user is eligible or not without departing from the spirit of the invention. Because the online process may have an objective of processing all targeted users by a particular date and time, it is helpful to include a mechanism that allows the eligible/defer criteria to change over time. The criteria can change either automatically as the goal time approaches or by administrative intervention.

Figure 6:
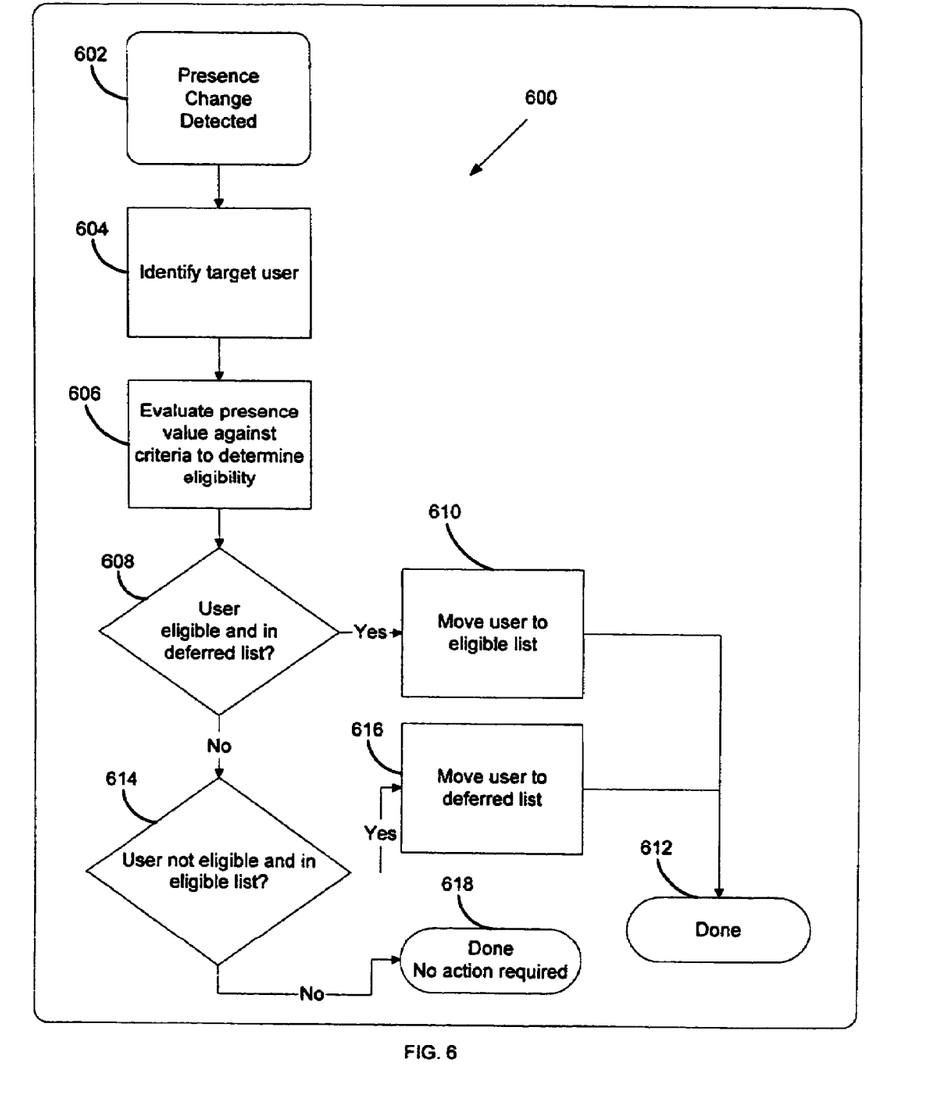
FIG. 6 shows a flow chart representation of a criteria change application in an embodiment of the present invention.

With reference to FIG. 6, a flow chart representation of a criteria change application in an embodiment of the present invention in an embodiment of the present invention is shown. It is noted that the process shown in FIG. 6 can run in parallel with the application described in FIG. 5. Further, the process of FIG. 6 can move party's back and forth between the eligible and deferred lists. The two lists shown on FIG. 6 can be the same two lists that are shown in FIG. 5. Application 600 begins when a presence change has been detected from presence system 302 at state 602. Application 600 identifies what user's presence has changed at state 604. At state 606, application 600 evaluates the presence value against the criteria to determine eligibility (such as the table three listed above). Application 600 then queries whether user 116 is eligible and in a deferred list at state 608. If user 116 is eligible and was on a deferred list, application 600 moves user 116 to an eligible list at state 610. The application is complete at state 612. If user 116 is not eligible or not on a deferred list, application 600 queries whether user 116 is not eligible and in an eligible list at state 614. If user is not eligible and is currently on an eligible list, application 600 moves user 116 to a deferred list at state 616 and application 600 ends at state 612. If user is eligible and on an eligible list, application 600 takes no action as application 400 or 500 will process this user accordingly.

Figure 7:
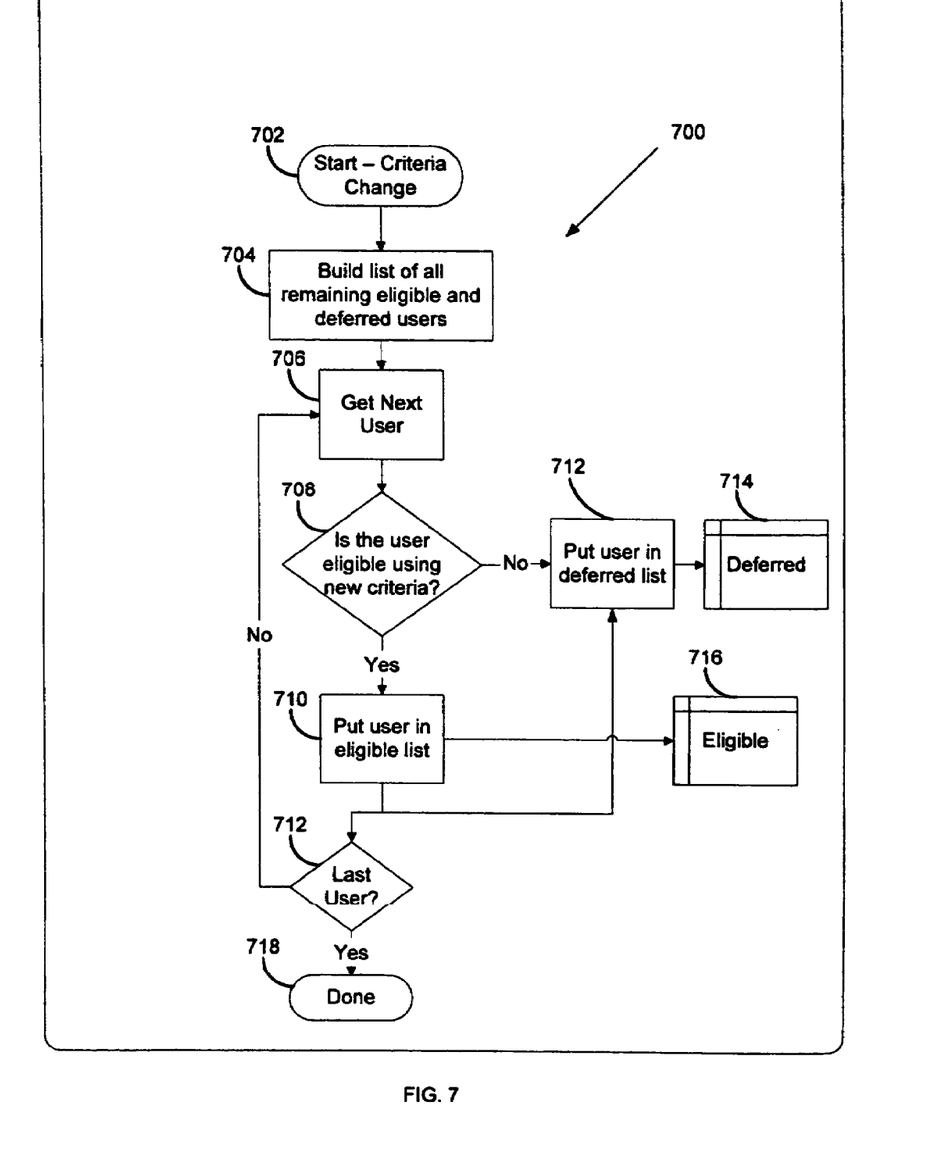
FIG. 7 shows a flow chart representation of a criteria change application in an embodiment of the present invention.

With reference to FIG. 7, a flow chart representation of a criteria change application in an embodiment of the present invention in an embodiment of the present invention is shown. It is noted that the process of FIG. 7 can run in parallel with those shown in FIG. 6 and FIG. 5. Further, eligible list 716 and deferred list 714 can be the same as those described in FIG. 5 and FIG. 6. Application 700 begins by changing the eligible deferred criteria at state 702. An example of such a criteria change is an administrator deciding to loosen the online affinity criteria from level 1 to level 2 (because the administrator wants the process to complete sooner). This changing of the criteria could be performed in any of the methods listed above without departing from the spirit of the invention. At state 704 application 700 builds a list of all remaining eligible and deferred users. Application 700 then gets the next user at state 706. At state 706, application 700 loops through each user in the list that was compiled in step 704. For each user in the list, it is determined if the user is eligible using the new criteria in step 708. If the user is eligible, application 700 places the user in eligible list 716 at state 710. If the user is still not eligible, then the user is placed in deferred list 714 at state 712. At state 712 application 700 determines if the last user has been processed at state 712. If there are remaining users, then application 700 returns to state 706 to begin the process all over again. If there are no remaining users left to be processed, then application 700 terminates at state 718.

Figure 8:
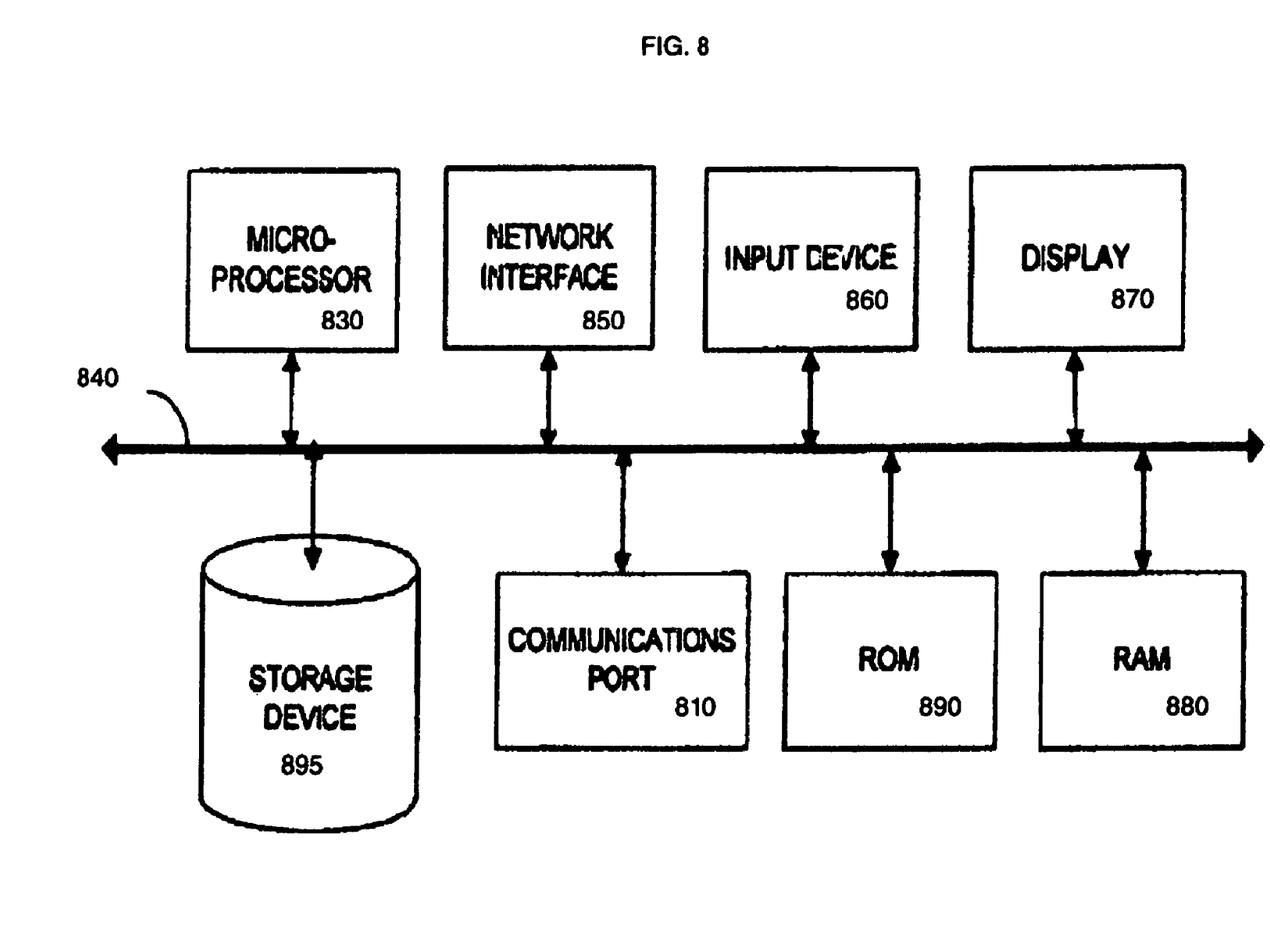
FIG. 8 is a block diagram of the internal architecture of a computing, device according to some embodiments of the invention.

FIG. 8 is a representative block diagram of a computing device according to some embodiments. It is understood computing device 304 could be used to execute algorithms 400, 500, 600, and/or 700 described above. Computing device 304 may comprise a single device or computer, a networked set or group of devices or computers, such as a workstation, laptop etc. Computing device 304 is typical of a data session-capable machine. Computing device 304 can include a microprocessor 830 in communication with communication bus 840. Microprocessor 830 is used to execute processor-executable process steps so as to control the components computing device 304 to provide functionality according to embodiments of the present invention. Microprocessor 830 may comprise a Pentium™, or Itanium™ microprocessor manufactured by Intel™ Corporation. Other suitable processors may be available from Motorola™, Inc., AMD™, or Sun Microsystems™, Inc. Microprocessor 830 also may comprise one or more microprocessors, controllers, memories, caches and the like.

Input device 860 and display 870 are also in communication with communication bus 840. Any known input device may be used as input device 860, including a keyboard, mouse, touch pad, voice-recognition system, or any combination of these devices. Input device 860 may be used by a user to input information and commands and select a destination party (parties) to initiate instant messaging.

Display 870 may be an integral or separate CRT display, a flat-panel display or the like. Display 850 is generally used to output graphics and text to an operator in response to commands issued by microprocessor 830. Display 870 may display presentation data and the like which is used during the online processes session.

RAM (Random Access Memory) 880 is connected to communication bus 840 to provide microprocessor 830 with fast data storage and retrieval. In this regard, processor-executable process steps being executed by microprocessor 830 are typically stored temporarily in RAM 880 and executed therefrom by microprocessor 830. ROM (Read Only Memory) 890, in contrast, may provide storage from which data can be retrieved but to which data cannot be stored. Accordingly, ROM 890 may be used to store invariant process steps and other data, such as basic input/output instructions and data used during system boot-up or to control input device 860. One or both of RAM 880 and ROM 890 may communicate directly with microprocessor 830 instead of over communication bus 840, or on separate dedicated busses.

Data storage device 895 stores, among other data, processor-executable process steps of presence online processes algorithms 400, 500, 600, and/or 700 discussed with respect to FIGS. 4-7. The process steps and program code of algorithms 400, 500, 600, and/or 700 and the like may be read from a computer-readable medium, such as a floppy disk, a CD-ROM, a DVD-ROM, a Zip™ disk, a magnetic tape, or a signal encoding the process steps/program code, and then stored in data storage device 895 in a raw, compressed, uncompiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 850 which may be a wired or wireless Ethernet interface, a modem interface, and so on. In utilizing the various embodiments of the invention, the network interface 850 may be connected to or to provide or access a high-speed connection to the Internet or an Intranet providing access to the Internet or similar networks. Using such a network or networks, computing device 304 can communicate identifiers of destination parties to a mobile application serve.

Stored in data storage device 895 may also be other elements that may be necessary for operation of computing device 304, such as other applications, other data files, a network server, an operating system, a database management system and "device drivers" for allowing microprocessor 830 to interface with external devices. These elements are known to those skilled in the art, and are therefore not described in detail herein.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer program product for managed online processes, the computer program product including computer program code stored in a data storage device and executable by a processor comprising:

computer program code configured to initiate an online process;

computer program code configured to determine a type of said online process between a first type of online process and a second type of online process, wherein said first type of online process is automated with a computing system associated with a user and without requirement of activity of said user and said second type of said online process requires interactivity from said user at said computing system associated with said user;

computer program code configured to create a list of targeted users, the list of targeted users requiring said online process;

computer program code configured to obtain presence information for the list of targeted users; and computer program code configured to prioritize the list of targeted users based upon said type of said online process and the presence information for each of the targeted users.

2. The computer program product of claim 1, further comprising computer program code configured to create an eligible list of the targeted users to have an online process performed on their computer.

3. The computer program product of claim 2, further comprising computer program code configured to create a deferred list of the targeted users to have an online process performed on their computer at a delayed time.

4. The computer program product of claim 3, further comprising computer program code configured to access a first targeted user in the eligible list.

5. The computer program product of claim 4, further comprising computer program code configured to initiate the online process on the first targeted user's computer.

6. The computer program product of claim 5, further comprising computer program code configured to determine if the targeted user is a final targeted user to have the online process performed on their computer.

7. The computer program product of claim 6, further comprising computer program code configured to create a list of all remaining eligible and deferred targets.

8. The computer program product of claim 1, wherein a first targeted user with presence information of available is given priority over a second targeted user with presence information of busy when said second type of said online process is initiated.

9. The computer program product of claim 1, wherein a first targeted user with presence information of out of office is given priority over a second targeted user with presence information of in office when said first type of said online process is initiated.

10. The computer program product of claim 1, wherein prioritizing the targeted users is further based upon a management level of each user.

11. A machine readable medium comprising machine executable instructions stored in a data storage device and executable by a processor, comprising:

list instructions that creates a list of targeted online process users, the list of targeted users requiring said online process;

determination instructions that determine a type of said online process between a first type of online process and a second type of online process, wherein said first type of online process is automated with a computing system associated with a user and without requirement of activity of said user and said second type of said online process requires interactivity from said user at said computing system associated with said user;

presence instructions that obtains presence information for users from said list of targeted online process users from a presence system; and order instructions that prioritize each of the users from the list of targeted users based upon said type of said online process and their presence information.

12. The medium of claim 11, wherein the order instructions creates a list of eligible users.

13. The medium of claim 12, wherein the order instructions creates a list of deferred users.

14. The medium of claim 13, further comprising access instructions that accesses the users in the eligible list.

15. The medium of claim 14, further comprising process instructions that initiates an online process on the accessed user's computer.

16. The medium of claim 15, further comprising target instructions that determine if the process instructions have performed an online process on all the eligible users.

17. The medium of claim 16, further comprising criteria instructions that determines if the deferred users can be moved to the eligible users list.

18. The medium of claim 11, wherein a first user with presence information of available is given priority over a second user with presence information of busy when said second type of said online process is initiated.

19. The medium of claim 11, wherein a first user with presence information of out of office is given priority over a second user with presence information of in office when said first type of said online process is initiated.

20. The medium of claim 11, wherein order instructions that prioritize the users is further based upon a management level of each user.

* * * * *